(12) United States Patent
Liao et al.

(10) Patent No.: US 7,523,682 B2
(45) Date of Patent: Apr. 28, 2009

(54) BALL SCREW DEVICE HAVING A BALL GUIDE MEMBER

(75) Inventors: Chi Meng Liao, Taichung (TW); Yan Yu Chen, Taichung (TW)

(73) Assignee: Hiwin Technologies Corp., Situn Taichung (TW)

( * ) Notice: Subject to any disclaimer, the term of this patent is extended or adjusted under 35 U.S.C. 154(b) by 407 days.

(21) Appl. No.: 11/391,562

(22) Filed: Mar. 28, 2006

(65) Prior Publication Data

US 2008/0190230 A1    Aug. 14, 2008

(51) Int. Cl.
    *F16H 1/24*    (2006.01)
(52) U.S. Cl. ............... 74/424.87; 74/424.83; 74/424.86
(58) Field of Classification Search ............. 74/424.71, 74/424.83, 424.86, 424.87, 424.82
    See application file for complete search history.

(56) References Cited

U.S. PATENT DOCUMENTS

| | | | | | |
|---|---|---|---|---|---|
| 2,519,777 | A | * | 8/1950 | Cochrane | 74/424.87 |
| 2,780,943 | A | * | 2/1957 | Anthony | 74/424.87 |
| 2,833,157 | A | * | 5/1958 | Gates | 74/424.87 |
| 3,156,133 | A | * | 11/1964 | Anthony | 74/424.83 |
| 3,512,425 | A | * | 5/1970 | Endo | 74/388 PS |
| 3,577,796 | A | * | 5/1971 | Eissfeldt | 74/424.83 |
| 4,211,125 | A | * | 7/1980 | Benton | 74/424.82 |
| 4,357,838 | A | * | 11/1982 | Blaurock et al. | 74/424.87 |
| 5,193,409 | A | | 3/1993 | Babinski | 74/89.15 |
| 5,303,607 | A | * | 4/1994 | Katahira | 74/424.87 |
| 5,492,036 | A | | 2/1996 | Sato | 74/459 |
| 5,791,192 | A | * | 8/1998 | Lee | 74/424.87 |
| 6,425,302 | B2 | * | 7/2002 | Greubel | 74/424.87 |
| 6,561,053 | B2 | * | 5/2003 | Greubel | 74/424.87 |
| 6,681,651 | B2 | * | 1/2004 | Fujita | 74/424.86 |
| 7,350,434 | B2 | * | 4/2008 | Nishimura et al. | 74/424.86 |

* cited by examiner

*Primary Examiner*—Richard W L Ridley
*Assistant Examiner*—Matthew A Johnson
(74) *Attorney, Agent, or Firm*—Charles E. Baxley

(57) ABSTRACT

A ball screw device includes a screw shaft threaded with a ball nut which has two channels and an opening, a guide member is engaged into the opening of the ball nut and has two curved pathways communicating with the channels to form two separated endless ball rolling passages in the ball nut, and two groups of bearing members are engaged in the two separated endless ball rolling passages for facilitating a movement of the ball nut relative to the screw shaft. The guide member includes two bars for enclosing the curved pathways of the guide member, and the bars each have a curved recess for forming the curved pathways of the guide member and for allowing the guide member to be easily manufactured.

3 Claims, 7 Drawing Sheets

BALL SCREW DEVICE HAVING A BALL GUIDE MEMBER

BACKGROUND OF THE INVENTION

1. Field of the Invention

The present invention relates to a ball screw device, and more particularly to a ball screw device having an inserted ball guide member for effectively and smoothly receiving and guiding the balls or the bearing members to move relative to the ball nut and the screw shaft, and thus for facilitating the rotational movement of the ball nut and the screw shaft relative to each other in great rotational speeds.

2. Description of the Prior Art

Typical ball screw devices comprise a ball nut rotatably and/or moveably engaged onto a screw shaft, and normally arranged to allow the ball nut to be rotated and/or moved relative to the screw shaft in great rotational speeds. For allowing the ball nut to be smoothly rotated and moved relative to the screw shaft, a suitable bearing device or lubricating structure is further required to be provided and engaged between the ball nut and the screw shaft, for facilitating the rotational movement between the ball nut and the screw shaft.

For example, U.S. Pat. No. 5,193,409 to Babinski discloses one of the typical ball screw devices including an inbuilt plastic insert provided or engaged into the ball nut for forming a ball return passage or an endless ball train guiding passage and for receiving a number of balls or a ball train therein, and for allowing the balls or the ball train to be engaged between the ball nut and the screw shaft to facilitate the rotational movement between the ball nut and the screw shaft.

In Babinski, the inbuilt plastic insert includes two ball return channels that are 180° reversed in orientation when in assembled position. However, due to manufacturing or machining considerations, the ball return channels of the inbuilt plastic insert should be exposed and may not be deeply formed in the inbuilt plastic insert, such that the balls or the ball train may not be effectively guided to move into the corresponding axial return passages that are formed and provided in the ball nut.

U.S. Pat. No. 5,492,036 to Sato discloses another typical ball screw device including two end caps attached to two end portions of the ball nut and having curved passages formed therein for guiding or deflecting the balls or the ball train. However, there in only one ball return passage or endless ball train guiding passage may be formed and provided between the ball nut and the ball screw and between the two end caps, such that only a limited number of the balls or the ball train may be provided and engaged between the ball nut and the ball screw.

The present invention has arisen to mitigate and/or obviate the afore-described disadvantages of the conventional ball screw devices for such as machine tools or the like.

SUMMARY OF THE INVENTION

The primary objective of the present invention is to provide a ball screw device including an inserted ball guide member for effectively and smoothly receiving and guiding the balls or the bearing members to move relative to the ball nut and the screw shaft, and for facilitating the rotational movement of the ball nut and the screw shaft relative to each other in great rotational speeds.

The other objective of the present invention is to provide a ball screw device including an inserted ball guide member having two curved pathways for forming two separated endless ball rolling passages in the ball nut and for smoothly receiving and guiding two groups of bearing members.

The further objective of the present invention is to provide a ball screw device including an inserted ball guide member having two curved pathways and having two curved bars for enclosing the curved pathways and for stably receiving and guiding the bearing members.

In accordance with one aspect of the invention, there is provided a ball screw device comprising a ball nut including a bore formed therein and having an inner thread formed therein and defined by a number of helical groove portions, the ball nut including at least one opening formed therein and communicating with the bore thereof, and the ball nut including a first channel and a second channel formed therein and communicating with the opening thereof, a screw shaft rotatably engaged into the bore of the ball nut, and including an outer thread formed thereon and defined by a number of helical groove portions for threading with the inner thread of the ball nut and for allowing the ball nut to be rotated and moved relative to the screw shaft, at least one guide member engaged into the opening of the ball nut, and including two curved pathways formed therein and communicating the first and the second channels with the helical groove portions of the ball nut respectively to form two separated endless ball rolling passages in the ball nut respectively, and two groups of bearing members engaged in the two separated endless ball rolling passages in the ball nut respectively for engaging between the ball nut and the screw shaft and for facilitating a movement of the ball nut relative to the screw shaft.

The guide member includes two bars engaged therein for enclosing the curved pathways of the guide member and for stably receiving the bearing members in the curved pathways of the guide member respectively.

The bars of the guide member each include a curved recess formed therein for forming the curved pathways of the guide member respectively. The guide member includes at least one cavity formed therein for receiving a fastener which is engaged with the ball nut for securing the guide member to the ball nut.

The ball nut includes at least two end deflectors engaged therein, and the end deflectors each include a curved slot formed therein and communicating the first and the second channels with the helical groove portions of the ball nut respectively to form the two separated endless ball rolling passages in the ball nut respectively. The ball nut includes two depressions formed therein for receiving the end deflector therein respectively.

The guide member includes a curved outer surface for flushing with a corresponding curved outer surface of the ball nut and for forming an integrated structure for the ball nut. The guide member includes at least one helical groove portion formed therein for aligning with the helical groove portions of the ball nut.

Further objectives and advantages of the present invention will become apparent from a careful reading of the detailed description provided hereinbelow, with appropriate reference to the accompanying drawings.

DETAILED DESCRIPTION OF THE PREFERRED EMBODIMENT

Figure 1:
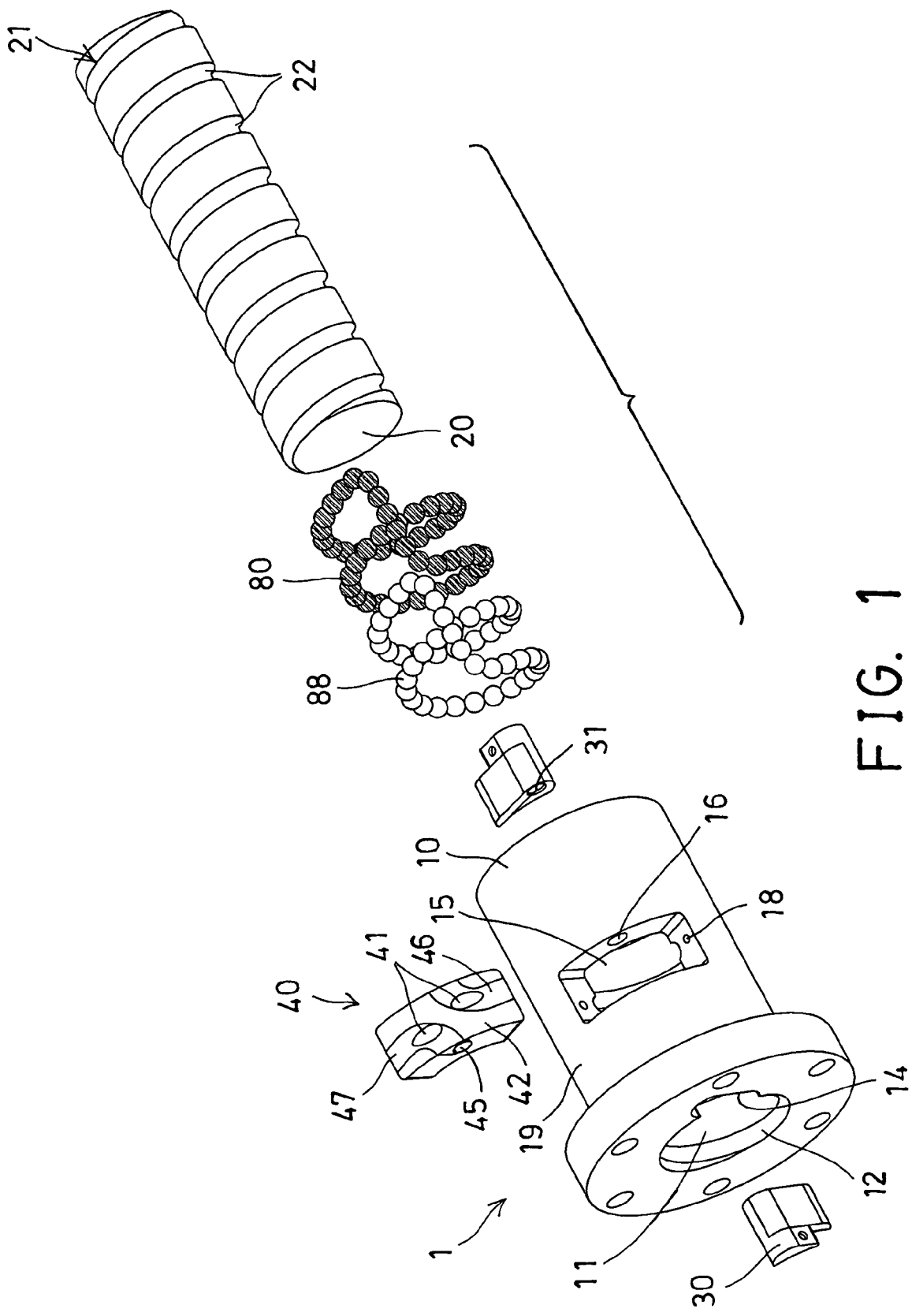
FIG. 1 is a partial exploded view of a ball screw device in accordance with the present invention.
Figure 2:
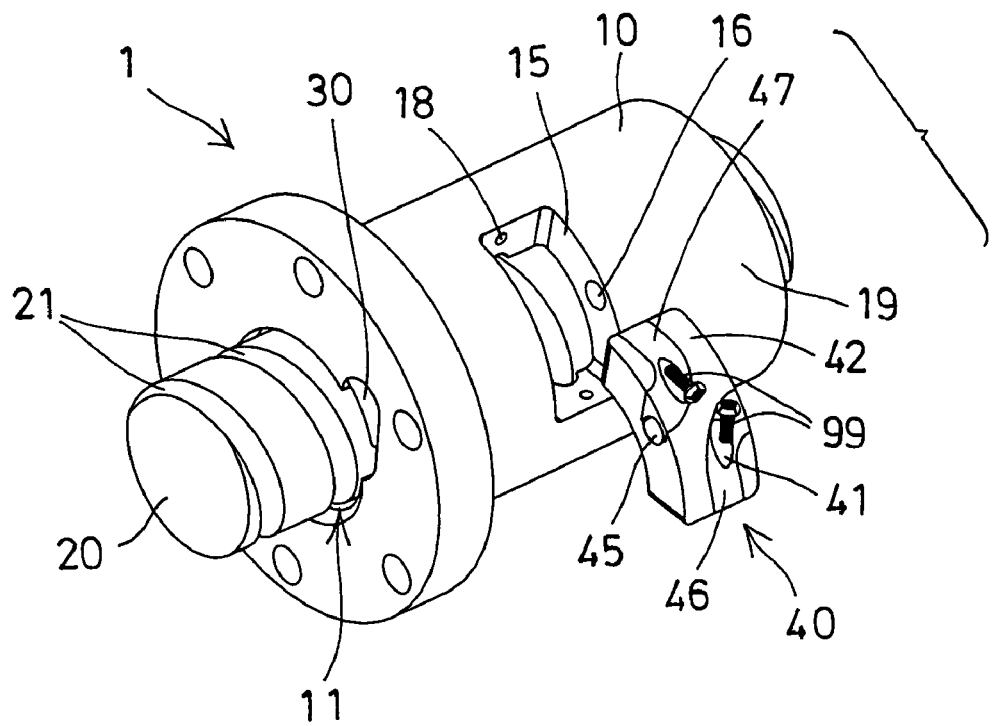
FIG. 2 is another partial exploded view of the ball screw device.
Figure 3:
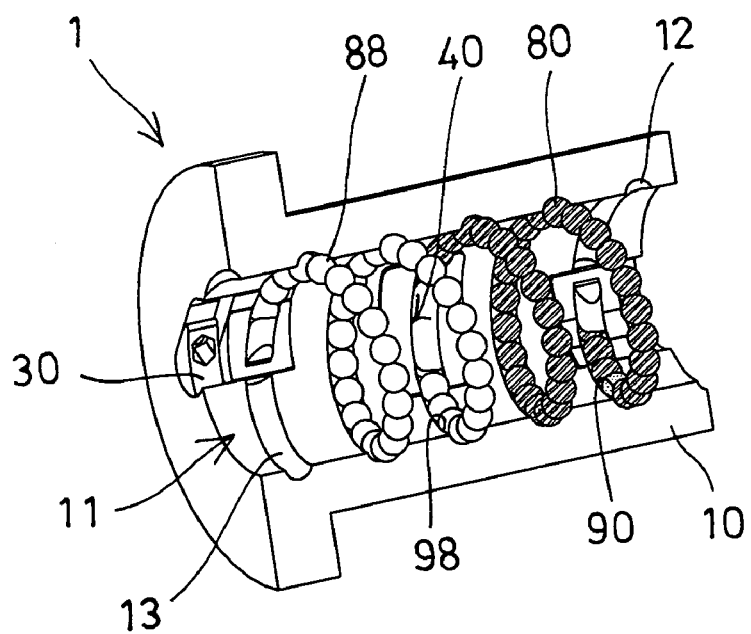
FIG. 3 is a partial perspective view of the ball screw device, in which one half of the ball screw device has been cut off for showing an inner structure of the ball screw device.
Figure 4:
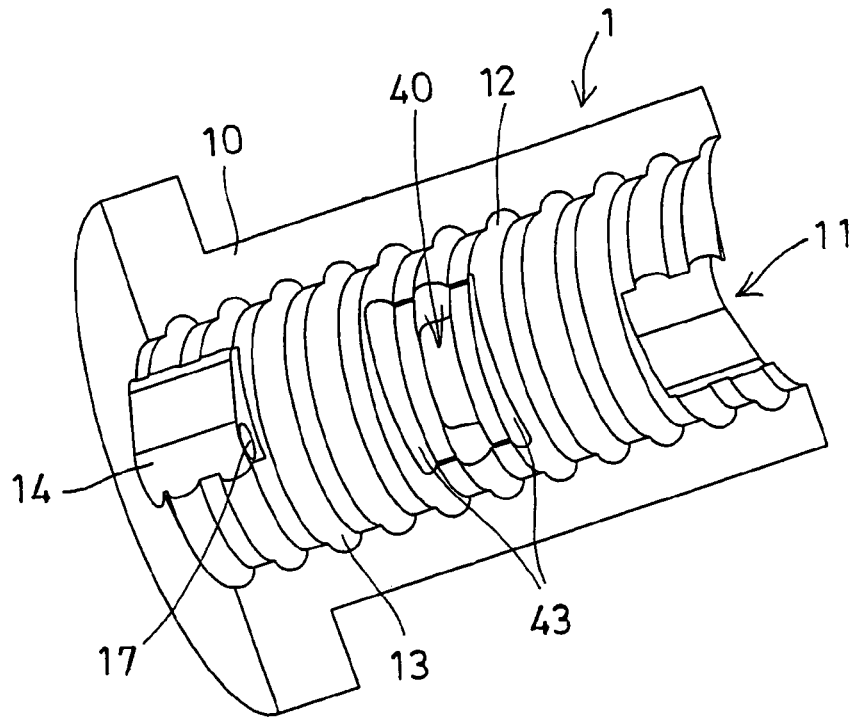
FIG. 4 is another partial perspective view of the ball screw device, similar to FIG. 3, in which the balls or the ball train has been removed from the ball screw device for showing the inner structure of the ball screw device.

Referring to the drawings, and initially to FIGS. 1-5, a ball screw device 1 in accordance with the present invention comprises an outer ball nut 10 including a bore 11 formed therein and having an inner thread 12 formed therein and defined by a number of peripheral and helical groove portions 13 (FIGS. 3, 4), for threading with an outer thread 21 of a screw shaft 20, and thus for allowing the ball nut 10 to be moved along the screw shaft 20, or for allowing the screw shaft 20 to be rotated and moved relative to the ball nut 10.

The screw shaft 20 also includes a number of peripheral and helical groove portions 22 formed therein for forming or defining the outer thread 21 thereof, and for forming a multiple turn, helical raceway and for rotatably and/or movably receiving one or more groups of balls or rollers or rolling or ball bearing members 80, 88 therein which may facilitate the rotating movement of the ball nut 10 relative to the screw shaft 20 when the screw shaft 20 is forced to rotate relative to the ball nut 10 or when the ball nut 10 is forced to rotate relative to the screw shaft 20, in order to constitute the primary structure of the ball screw device 1.

Figure 5:
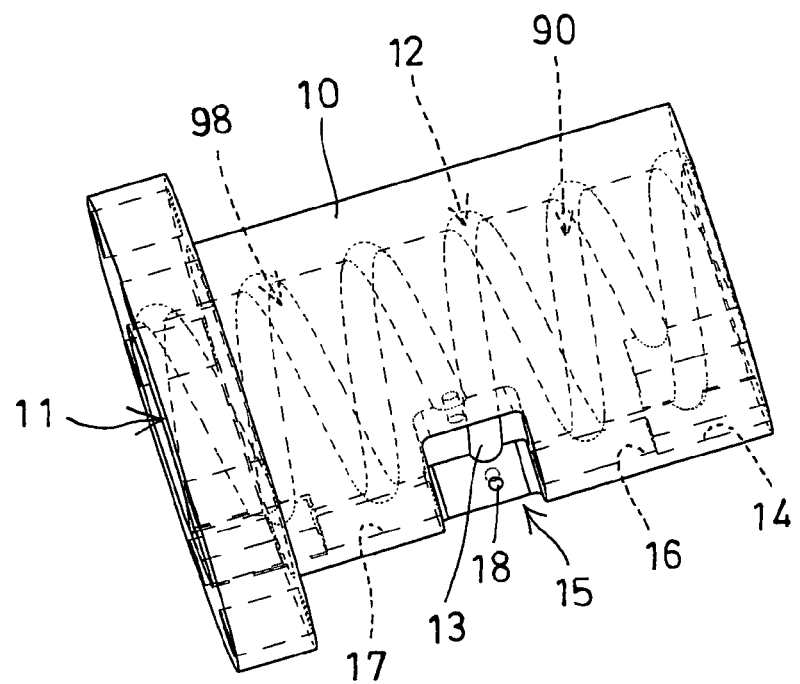
FIG. 5 is an enlarged perspective view illustrating the outer ball nut of the ball screw device.
Figure 8:
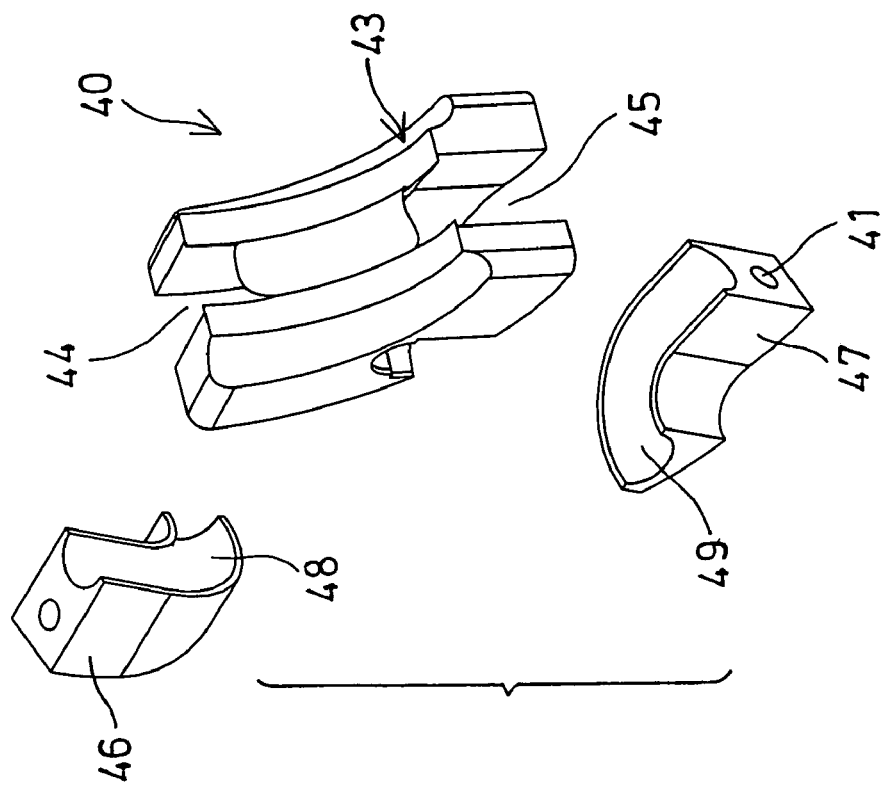
FIG. 8 is an exploded view of the inserted ball guide member of the ball screw device.
Figure 7:
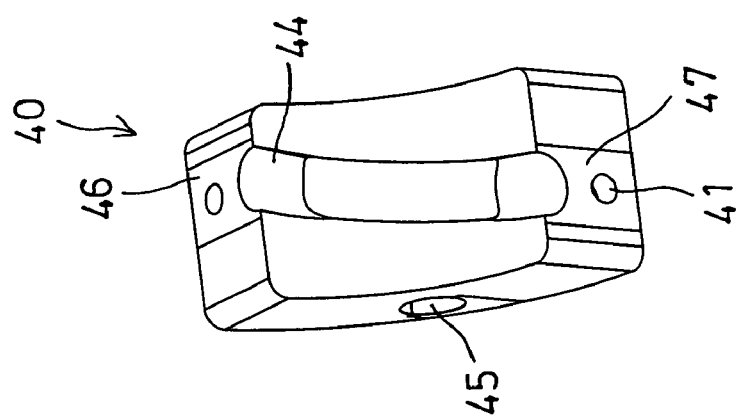
FIG. 7 is an inner perspective view of the inserted ball guide member of the ball screw device.
Figure 6:
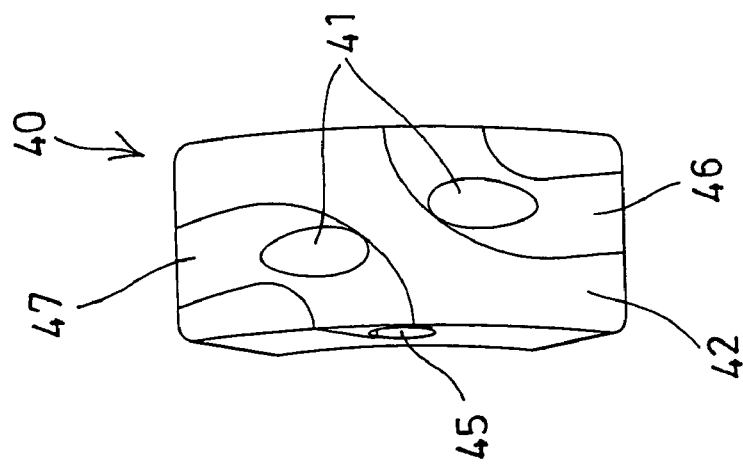
FIG. 6 is an outer perspective view illustrating an inserted ball guide member of the ball screw device.
Figure 9:
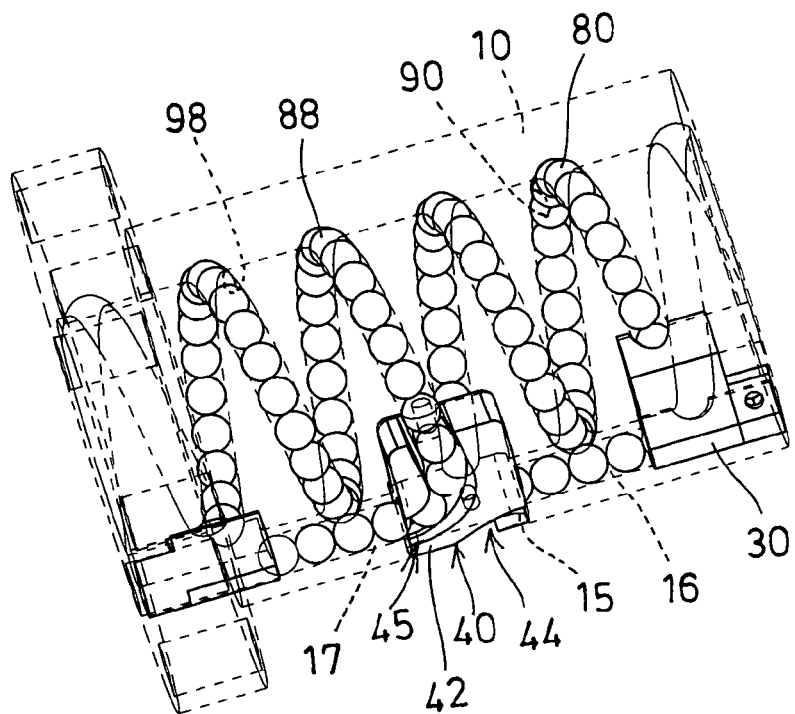
FIG. 9 is an enlarged perspective view illustrating the arrangement of the balls or the ball train in the ball nut of the ball screw device.

The ball nut 10 includes one or more, such as two depressions 14 formed therein (FIGS. 1, 4) each for receiving an end deflector 30 therein (FIGS. 3, 9, 13) The ball nut 10 further includes one (FIGS. 3, 4) or more openings 15 (FIG. 13) formed therein and communicating with the bore 11 thereof (FIGS. 1, 2, 5), and further includes one or more, such as two channels 16, 17 formed therein (FIGS. 1, 5, 9) and communicating with the openings 15 thereof, and further includes one or more, such as two screw holes 18 formed therein (FIGS. 1, 5).

Actually, the two channels 16, 17 of the ball nut 10 are aligned with each other, and are actually a single longitudinal channel 16, 17 formed in the ball nut 10 and passing through or intersecting with the opening 15 of the ball nut 10. However, for forming and representing two different or separated endless ball rolling passages 90, 98 (FIGS. 1, 3, 5, 9) to receive the two different or separated groups of ball bearing members 80, 88, and for structure describing purposes, the single longitudinal channel 16, 17 has been separated and indicated with two reference numerals 16, 17 to represent two different channels 16, 17 that are separated from each other by the opening 15 of the ball nut 10.

Figure 10:
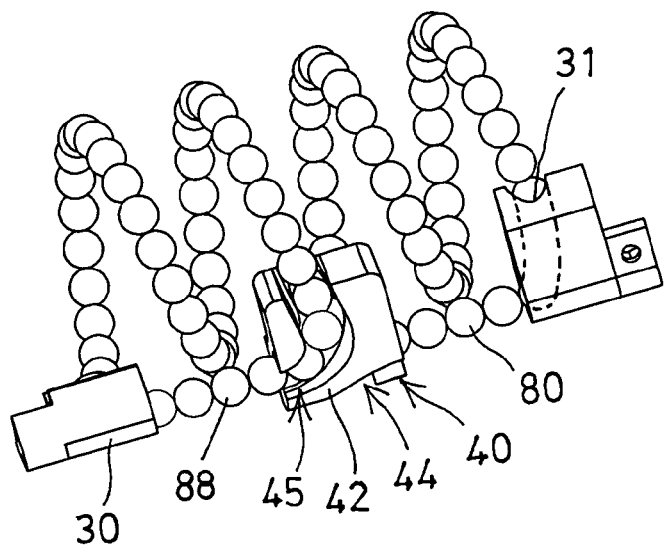
FIGS. 10, 11, 12 are enlarged perspective views similar to FIG. 9, illustrating the arrangement of the balls or the ball train in the ball nut of the ball screw device.
Figure 12:
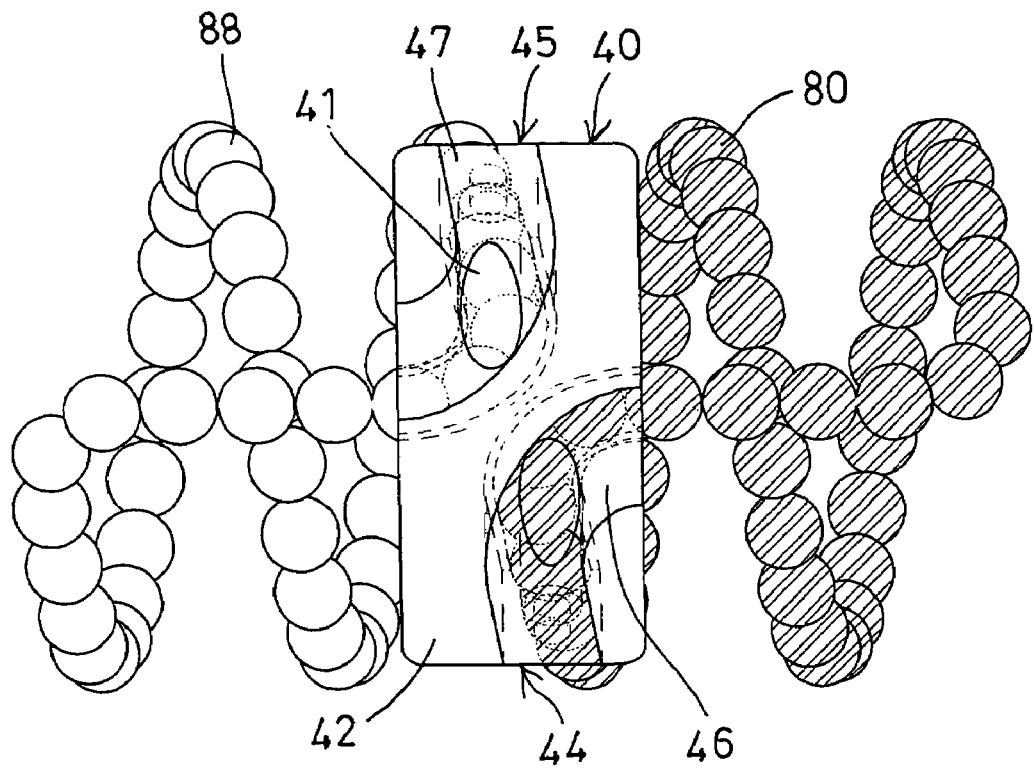
Figure 11:
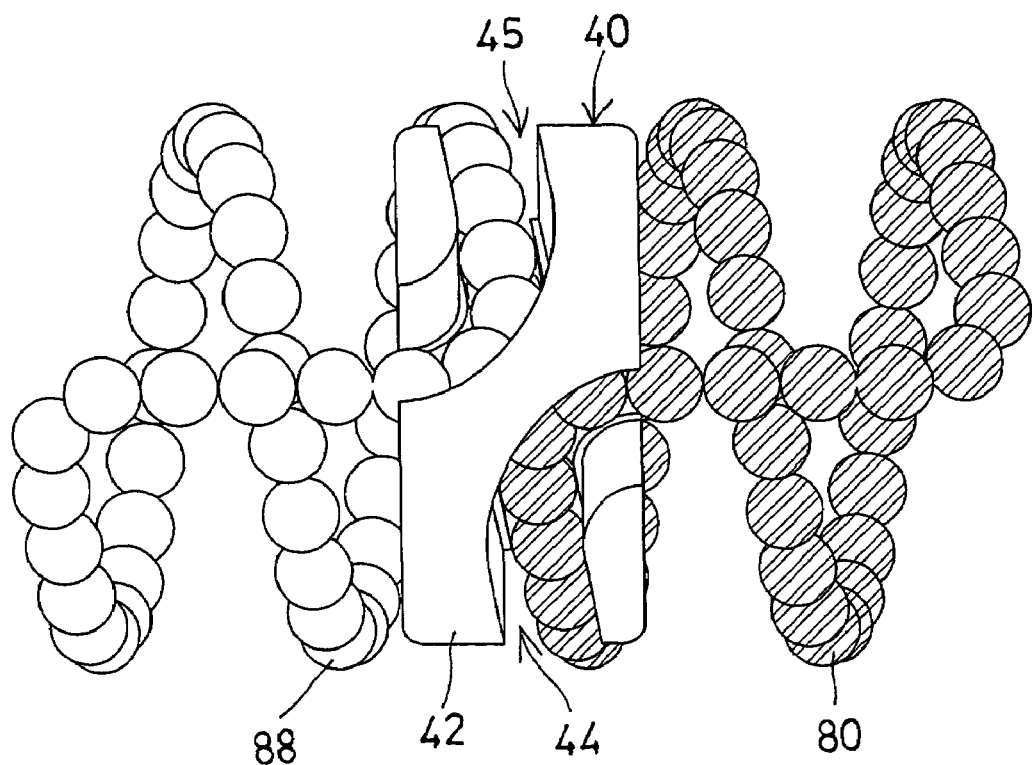

The end deflectors 30 each may include a curved slot 31 formed therein (FIG. 1) for communicating with the channels 16, 17 of the ball nut 10 respectively (FIGS. 4, 5), and communicating with the helical groove portions 13 or the inner thread 12 of the ball nut 10 for guiding the two different or separated groups of ball bearing members 80, 88 to move into or out of the channels 16, 17 of the ball nut 10 respectively (FIGS. 9, 10), and thus for forming the end portions of the two different or separated endless ball rolling passages 90, 98 (FIGS. 1, 3, 5, 9). The end deflectors 30 may also be replaced with the end caps as disclosed in U.S. Pat. No. 5,492,036 to Sato which may also be taken as a reference for the present invention.

As shown in FIGS. 1-4 and 6-9, the ball nut 10 further includes one or more ball guide members 40 for engaging into the openings 15 of the ball nut 10 respectively, and the ball guide members 40 each may include one or more cavities 41 formed therein for aligning with the screw holes 18 of the ball nut 10 and for receiving fasteners 99 (FIG. 2) which may be threaded or engaged with the screw holes 18 of the ball nut 10 for securing the ball guide members 40 to the ball nut 10. It is preferable that the ball guide members 40 each may include a curved outer surface 42 corresponding to the curved outer surface 19 of the ball nut 10 (FIGS. 1, 2) for flushing with the curved outer surface 19 of the ball nut 10 and for forming a completed or integrated structure for the ball nut 10.

The ball guide members 40 each may further include one or more internal helical groove portions 43 formed therein (FIGS. 4, 8) for aligning with the helical groove portions 13 or the inner thread 12 of the ball nut 10 and for smoothly guiding the groups of ball bearing members 80, 88 to move through the internal helical groove portions 43 of the ball guide members 40. The ball guide members 40 each may further include two ball return and curved pathways 44, 45 formed therein that are 180° reversed in orientation when in assembled position, best shown in FIGS. 9-12, for communicating the channels 16, 17 with the peripheral and helical groove portions 13 of the ball nut 10 to form the two different or separated endless ball rolling passages 90, 98 respectively.

For example, the two ball return and curved pathways 44, 45 of the ball guide member 40 each has one end communicating with the channels 16, 17 respectively, and the other end communicating with the helical groove portions 13 or the inner thread 12 of the ball nut 10 at the two different or separated endless ball rolling passages 90, 98 respectively for allowing the two different or separated groups of ball bearing members 80, 88 to effectively or smoothly move from the channels 16, 17 of the ball nut 10 into or out of the two ball return and curved pathways 44, 45 of the ball guide member 40 respectively.

As shown in FIGS. 1-2, 6-8 and 12, the ball guide members 40 each may further include two bars 46, 47, such as two curved bars 46, 47 engaged therein, and the bars 46, 47 each may include a curved recess 48, 49 formed therein for forming the curved pathways 44, 45 of the ball guide member 40 respectively. The bars 46, 47 may be secured to the ball guide member 40 with such as fasteners or latches (not shown), adhesive materials, or by welding processes respectively. The curved recesses 48, 49 of the bars 46, 47 and the curved pathways 44, 45 of the ball guide member 40 may thus be exposed before the bars 46, 47 may be secured to the ball guide member 40, for allowing the bars 46, 47 and the ball guide members 40 to be easily and precisely manufactured or machined by the producers. The cavities 41 may be formed in the bars 46, 47 respectively, for example.

Accordingly, as shown in FIGS. 3-5 and 9-10, one of endless ball rolling passages 90 may be formed by a portion of the helical groove portions 13 or the inner thread 12 of the ball nut 10 and the channel 16 of the ball nut 10 and the curved pathway 44 of the ball guide member 40 and one of the end deflectors 30, and the other ball rolling passage 98 may be formed by another portion of the helical groove portions 13 or the inner thread 12 of the ball nut 10 and the other channel 17 of the ball nut 10 and the other curved pathway 45 of the ball guide member 40 and the other end deflector 30, for allowing the two endless ball rolling passages 90, 98 to be formed or separated by the ball guide member 40, and for allowing the two different or separated groups of ball bearing members 80, 88 to be guided to smoothly and effectively and cyclically move through the two different or separated endless ball rolling passages 90, 98 respectively.

Figure 13:
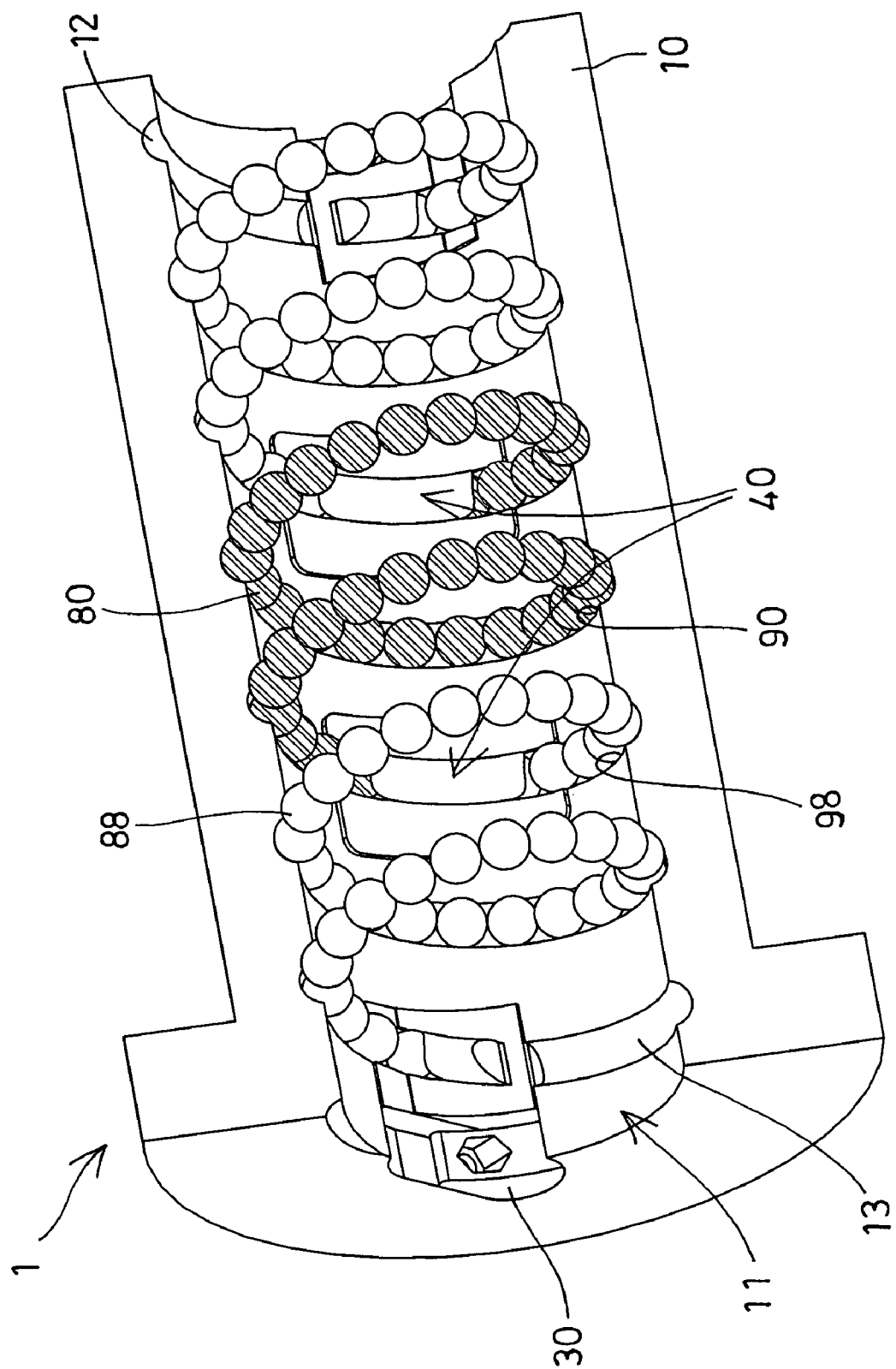
FIG. 13 is a partial perspective view similar to FIG. 3, illustrating the further arrangement of the ball guide member of the ball screw device.

As shown in FIG. 13, three or more separated groups of ball bearing members 80, 88 may also be provided and guided to cyclically move through three different or separated endless ball rolling passages 90, 98 respectively, for allowing each of the separated groups of ball bearing members 80, 88 to have a smaller number of ball bearing members 80, 88 and for allowing the groups of ball bearing members 80, 88 to easily and smoothly move through the separated endless ball rolling passages 90, 98 respectively.

It is to be noted that the curved pathways 44, 45 of the ball guide member 40 may be enclosed by the bars 46, 47 respectively for effectively and smoothly guiding the separated groups of ball bearing members 80, 88 to move into or out of the channels 16, 17 of the ball nut 10 respectively, in which the channels 16, 17 are formed in or through the ball nut 10 and arranged substantially parallel to the bore 11 of the ball nut 10.

Accordingly, the ball screw device in accordance with the present invention includes an inserted ball guide member for separating and for effectively and smoothly receiving and guiding two groups of balls or bearing members to move relative to the ball nut and the screw shaft, and for facilitating the rotational movement of the ball nut and the screw shaft relative to each other in great rotational speeds.

Although this invention has been described with a certain degree of particularity, it is to be understood that the present disclosure has been made by way of example only and that numerous changes in the detailed construction and the combination and arrangement of parts may be resorted to without departing from the spirit and scope of the invention as hereinafter claimed.

We claim:

1. A ball screw device comprising:
    a ball nut including a bore formed therein and having an inner thread formed therein and defined by a plurality of helical groove portions, said ball nut including at least one opening formed therein and communicating with said bore and said ball nut including a first channel and a second channel formed therein and communicating with said at least one opening, said ball nut further including two screw holes formed therein and two depressions formed therein
    a screw shaft rotatably engaged into said bore of said ball nut, and including an outer thread formed thereon and defined by a plurality of helical groove portions for threading with said inner thread of said ball nut and for allowing said ball nut to be rotated and moved relative to said screw shaft,
    at least one guide member engaged into said at least one opening of said ball nut, and including two curved pathways formed therein and reversed in orientation and communicating said first and said second channels with said helical groove portions of said ball nut respectively to form two separated endless ball rolling passages in said ball nut respectively,
    an end deflector engaged in each of said depressions of said ball nut and each end deflector including a curved slot formed therein and communicating said first and said second channels with said helical groove portions of said ball nut respectively to form said two separated endless ball rolling passages in said ball nut respectively,
    a group of bearing members engaged in each of said two separated endless ball rolling passages in said ball nut respectively for engaging between said ball nut and said screw shaft and for facilitating a movement of said ball nut relative to said screw shaft,
    two bars engaged in said at least one guide member for enclosing said curved pathways of said at least one guide member and for stably receiving said bearing members in said curved pathways of said at least one guide member respectively, and said bars each including a curved recess formed therein for forming said curved pathways of said at least one guide member respectively, and each bar including a cavity formed therein, and
    a fastener engaged in each of said cavities of said bars respectively, and engaged with said screw holes of said ball nut for securing said at least one guide member to said ball nut.

2. The ball screw device as claimed in claim 1, wherein said at least one guide member includes a curved outer surface that is flush with a corresponding curved outer surface of said ball nut and for forming an integrated structure for said ball nut.

3. The ball screw device as claimed in claim 1, wherein said at least one guide member includes at least one helical groove portion formed therein for aligning with said helical groove portions of said ball nut.

* * * * *